Feb. 18, 1936.                A. JOHNSON                2,030,875
                            FISHING APPARATUS
                           Filed Aug. 26, 1935
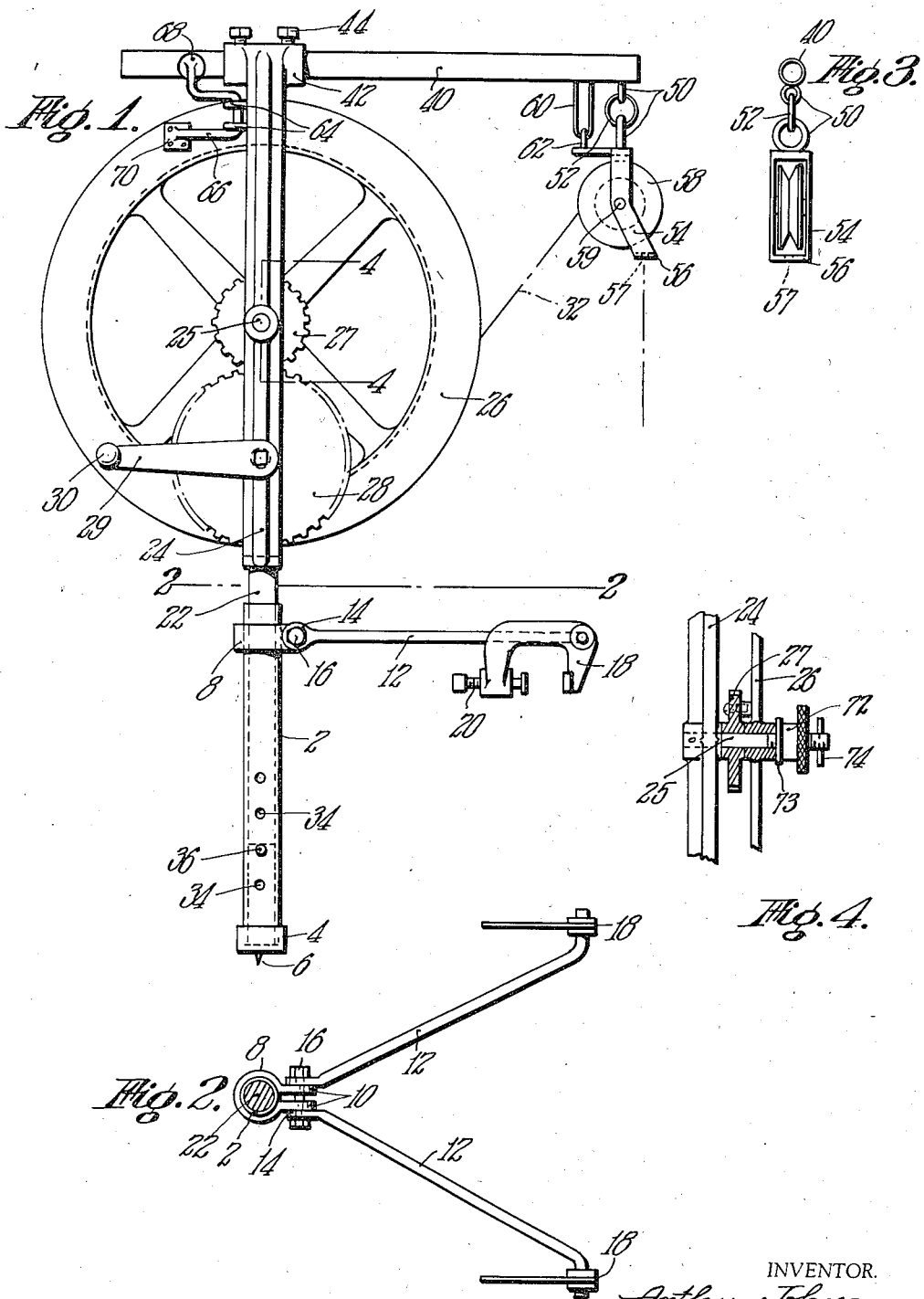
INVENTOR.
Arthur Johnson.
BY Walter C. Ross
ATTORNEY.

Patented Feb. 18, 1936

2,030,875

UNITED STATES PATENT OFFICE 2,030,875

FISHING APPARATUS

Arthur Johnson, Springfield, Mass.

Application August 26, 1935, Serial No. 37,796

7 Claims. (Cl. 242—84.1)

This invention relates to improvements in fishing apparatus and is directed more particularly to the provision of an improved fishing apparatus adapted to be conveniently associated with the side of a boat so that the apparatus may be readily used for deep sea fishing.

It is a principal object of this invention to provide means whereby a line may be readily reeled and unreeled while it is being supported adjacent the side of a boat. As a particular feature of the invention, the apparatus is formed and arranged so that the hook end of the line may be easily swung around so that it hangs inside the boat or outside the boat, as desired.

It is a further object of the invention to provide a fishing apparatus which comprises a number of movable and adjustable parts so that the apparatus may be easily associated with boats of various sizes and shapes and so that its various parts may be conveniently located relative to the side of the boat.

It is usual in present day deep sea fishing for a fisherman to provide himself merely with a line having a hook and sinker on the end thereof and allow the hook end to drop over the side of the boat. Then he has to pull the line up rapidly with his hands.

It is apparent that such a procedure is tedious and clumsy and is hard on the hands. If the line is not drawn in with an even and quite rapid pull, the catch is liable to extricate itself from the hook.

With the apparatus of this invention, however, it is not only relatively easy to unreel the line and drop it into the water, but it is equally easy to wind up the line with a steady and rapid movement. Furthermore, because of my novel construction, the apparatus may be associated with boats of varied size. Also, when the catch has been brought up above the level of the rail of the boat, the hook end of the line may be swung around so that the fish is supported inside the boat to allow the fisherman to remove the catch from the hook.

Various other novel features and advantages of the invention will become more apparent after a reading of the following description taken in connection with the accompanying drawing, wherein:

Fig. 1 is a side elevational view of the apparatus of the invention;

Fig. 2 is a sectional view on the line 2—2 of Fig. 1;

Fig. 3 is an end elevational view of the guide pulley assembly shown in Fig. 1; and Fig. 4 is a sectional view on the line 4—4 of Fig. 1.

Referring now to the drawing more in detail, the invention will be fully described.

A supporting member 2 of relatively rigid material is provided and this preferably takes the form of a hollow tube having a cap 4 on its lower end which is provided with a spur 6. This support 2 is adapted to stand upright in a boat adjacent the side thereof with the spur 6 more or less imbedded in the floor of the boat.

Means is provided to firmly hold the support in this position and to this end there is a split collar 8 slidable on the upper end portion of the support and having spaced lugs 10. Adjustably secured to the lugs 10 are tie rods 12 which preferably extend forwardly therefrom in a diverging relation as shown in Fig. 2.

The rods 12 have eyes 14 on their inner ends and, when assembled, a clamp bolt 16 extends through the eyes 14 and through the ears 10 so as to firmly clamp the tie rods to the support. With this construction, it will be seen, not only is the collar 8 adjustable relative to the support 2 but the rods 12 are adjustable up and down relative to the support.

On the outer ends of the tie rods 12 there are provided clamping members 18 which may take usual form and have spaced depending portions as shown by placing against opposite sides of the side of a boat. Each clamp 18 may have a thumb screw 20 as shown in Fig. 1 so as to firmly secure the support 2 in an upright position.

A spindle 22 is reciprocable and rotatable in the support 2 and this carries a bracket member 24 on its upper end which is relatively rigid and movable with the spindle. A shaft is associated with the bracket and it has a pulley wheel 26 rotatable thereon. A gear such as 27 is associated with the wheel 26 and is preferably non-rotatable relative thereto.

Another gear 28 is in intermeshing engagement with gear 27, and preferably of a different ratio. A crank 29 having a handle 30 associated therewith may be provided for rotating the driving gear 28 and moving the gear 27. Or, if desired, the crank 29 may be associated with the gear 27.

Extending forwardly from the upper end of the bracket 24 is an arm 40. This arm 40 is arranged to be adjustable relative to the bracket and preferably is slidable in a hub 42 thereof. Tightening nuts 44 may be provided for bearing on and holding the arm in a desired position.

What may be called a guide pulley is associated with the forward end of the arm 40 and it is desired that this guide pulley be more or less flexibly mounted on the arm. To this end two or more eyes 50 and rings 52 are arranged in link formation and the link supports a frame 54 on its lower end. The frame has a foot 56 on its lower side having an opening 57 therethrough. A shaft 59 is journalled for rotation in the frame 54 and this carries a guide wheel 58.

As added support to the guide pulley frame, a loop 60 may depend downwardly from the arm 40 with an eye 62 on its lower end for association with the frame. In this way, the guide pulley may move slightly relative to the pulley wheel.

Then a fishing line indicated by 32 wound around the wheel 26 extends upwardly over the pulley 58 and downwardly through the opening 57 in the foot thereof. Thus, with the apparatus adjusted so that the arm 40 extends outwardly over the water, the wheel 26 may be rotated to unreel the line over the pulley 58 so that the hook end of the line drops into the water.

It may sometimes be desired to elevate the pulley wheel 26 and arm 40 relative to the support 2 and to this end a plurality of holes 34 may be provided through the support 2 as shown for receiving a pin 36. Thus the spindle 22 may be lifted up to a certain level and its bottom allowed to rest on the pin.

What may be called a drag may be associated with the bracket 24 for moving into bearing engagement with the wheel 26. This may include a bearing loop or loops 64 associated with the bracket 24 in which a crank-like member 66 is rotatable. The crank-like member 66 is provided with a manually engageable part 68 and a foot portion 70 which preferably has a friction pad thereon such as a piece of leather or the like.

In this way, when it is desired to slow up the rotating of the pulley wheel the operator may press inwardly upon the member 68 to move the member 66 and cause the part 70 to bear on the wheel. Of course, the harder one presses upon the part 68, the greater is the drag on the pulley.

If desired, means may be provided to lock the pulley wheel against rotation. To this end, the end of the shaft on which the wheel 26 is rotatable may be threaded, as shown, and a binding nut 72 is rotatable on the threaded end portion and adapted to bear against the washer 73 so as to bind the wheel and gear against movement. A pin 74 may extend through the end of the shaft to prevent the nut 72 from screwing off the shaft.

While I have described the invention in great detail and with respect to a preferred form thereof, it is not desired to be limited thereto since many changes and modifications may be made therein without departing from the spirit and scope of the invention.

What it is desired to claim and secure by Letters Patent of the United States is:

1. A fishing apparatus of the class described comprising in combination, an upright support member having means associated therewith for attaching to the side of a boat, a spindle rotatable in said support and having a bracket on its upper end, a pulley wheel rotatable relative to said bracket, an arm extending forwardly of said bracket having a frame member flexibly mounted on its forward end, a guide pulley rotatable in said frame, means for rotating said shaft, and a fishing line extending from said pulley wheel and over said guide pulley, said frame member being provided with an opening in its lower side through which said line extends.

2. A fishing apparatus of the class described comprising in combination, a tubular support member having a cap on its lower end which is provided with a spur, clamping means associated with said support for attaching to the side of a boat, a spindle rotatable and reciprocable in said support and having a bracket rigidly associated with its upper end, a pulley wheel rotatable relative to said bracket, means for rotating said wheel, a forwardly extending arm on said bracket having a guide pulley on its forward end, and a fishing line extending from said pulley wheel and over said guide pulley.

3. A fishing apparatus of the class described comprising in combination, an upright support member having a collar adjustably associated with its upper end portion, tie rods adjustably fixed to said collar and extending forwardly therefrom, clamps on the forward ends of said rods for attaching to the side of a boat, a spindle rotatable in said support and having a bracket on its upper end, a pulley wheel rotatable relative to said bracket, an arm extending forwardly of said bracket having a guide pulley on its forward end, means for rotating said wheel, and a fishing line extending from said pulley wheel and over said guide pulley.

4. A fishing apparatus of the class described comprising in combination, an upright support member having means associated therewith for attaching to the side of a boat, a spindle rotatable in said support and having a rigid bracket on its upper end, a pulley wheel rotatable relative to said bracket, an arm extending forwardly of said bracket having flexible link means on its forward end, a frame member carried by said link means, a shaft rotatable in said frame, a guide pulley carried by said shaft, means for rotating said pulley wheel, and a fishing line extending from said pulley wheel and over said guide pulley, said frame member being provided with an opening in its lower side through which said line extends.

5. A fishing apparatus of the class described comprising in combination, an upright support member having means associated therewith for attaching to the side of a boat, a spindle rotatable in said support and having a bracket on its upper end, a pulley wheel rotatable relative to said bracket, an arm extending forwardly of said bracket having a frame member flexibly mounted on its forward end, a guide pulley rotatable in said frame, means for rotating said pulley wheel, means for locking said wheel against rotation, and a fishing line extending from said pulley wheel to said guide pulley.

6. A fishing apparatus of the class described comprising in combination, a tubular support member having clamping means associated therewith for attaching to the side of a boat, a spindle rotatable and reciprocable in said support and having a bracket rigidly associated with its upper end, a pulley wheel rotatable relative to said bracket and having a gear associated therewith which is non-rotatable relative thereto, a driving gear in meshing engagement with the first-named gear and arranged to drive the same, a forwardly extending arm on said bracket having a rotatable guide pulley on its forward end, and a fishing line extending from said pulley wheel and over said guide pulley.

7. A fishing apparatus of the class described comprising in combination, an upright support member having a collar adjustably associated with its upper end portion, a tie rod adjustably fixed to said collar and extending forwardly therefrom, a clamp on the forward end of said rod for attaching to the side of a boat, a spindle rotatable on a vertical axis in said support and having a bracket rigidly associated with its upper end, a pulley wheel rotatable on a horizontal axis relative to said bracket, means for rotating said pulley wheel on its axis, and a fishing line on said pulley wheel having a free end portion extending forwardly of said wheel, all adapted and arranged whereby said spindle may be rotated to move the said free end portion of said line to either side of said tie rod.

ARTHUR JOHNSON.